United States Patent [19]

Bonella

[11] Patent Number: 5,333,293
[45] Date of Patent: Jul. 26, 1994

[54] MULTIPLE INPUT FREQUENCY MEMORY CONTROLLER

[75] Inventor: Randy M. Bonella, Cypress, Tex.

[73] Assignee: Compaq Computer Corp., Houston, Tex.

[21] Appl. No.: 757,701

[22] Filed: Sep. 11, 1991

[51] Int. Cl.$^5$ .............................................. G06F 9/305
[52] U.S. Cl. ...................... 395/425; 364/DIG. 1; 364/261.8; 364/270.2
[58] Field of Search ................ 364/200 MS, 900 MS; 395/400, 425, 550 MS

[56] References Cited

U.S. PATENT DOCUMENTS

| | | | |
|---|---|---|---|
| 4,014,006 | 3/1977 | Sorensen et al. | 395/550 |
| 4,095,267 | 6/1978 | Morimoto | 395/550 |
| 4,821,229 | 4/1989 | Jauregui | 395/550 |
| 5,086,387 | 2/1992 | Arroyo et al. | 395/550 |
| 5,097,437 | 3/1992 | Larson | 395/775 |
| 5,179,667 | 1/1993 | Iyer | 395/275 |

*Primary Examiner*—Joseph L. Dixon
*Assistant Examiner*—Hiep T. Nguyen
*Attorney, Agent, or Firm*—Pravel, Hewitt, Kimball & Krieger

[57] ABSTRACT

A synchronous memory controller capable of operating with three different frequency microprocessors and yet providing similar DRAM timings. Input frequencies of 32, 25 and 33 MHz correspond to 16, 25 and 33 MHz microprocessors. Various states are bypassed at certain frequencies to allow the various memory, latch and buffer control signals to be produced uniformly. The memory controller also handles operations from external buses, such as the EISA and ISA buses at the various input frequencies. These external bus cycles are controlled by separate state machines, which also have states bypassed for certain input frequencies.

9 Claims, 11 Drawing Sheets

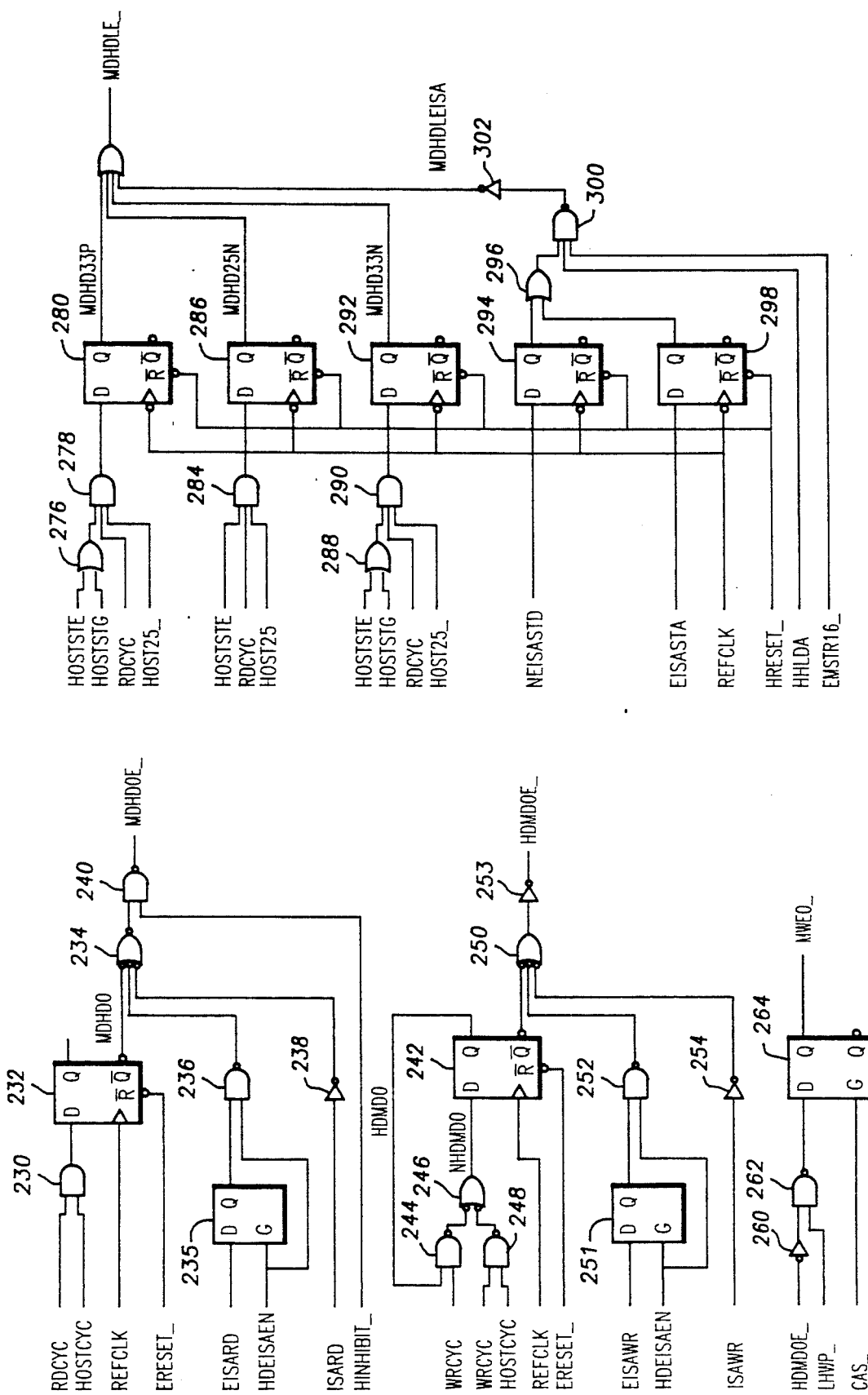

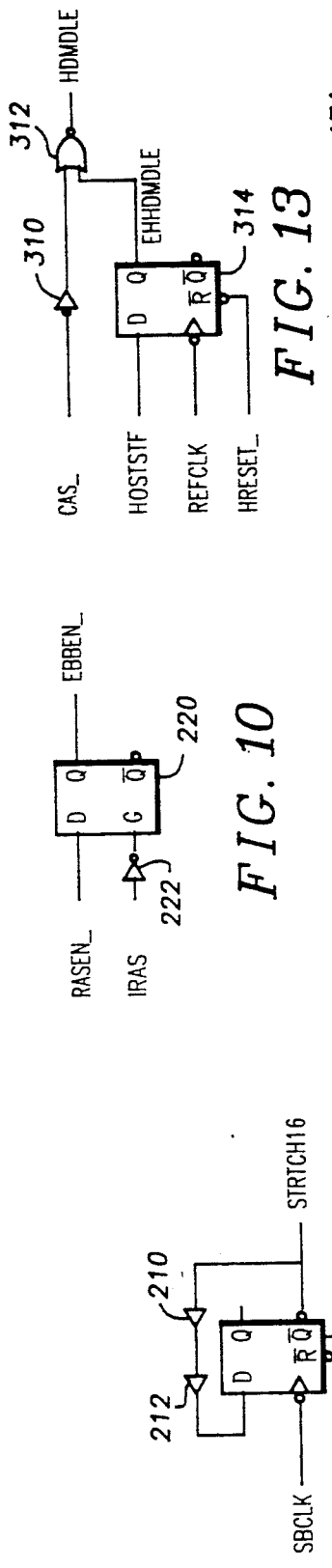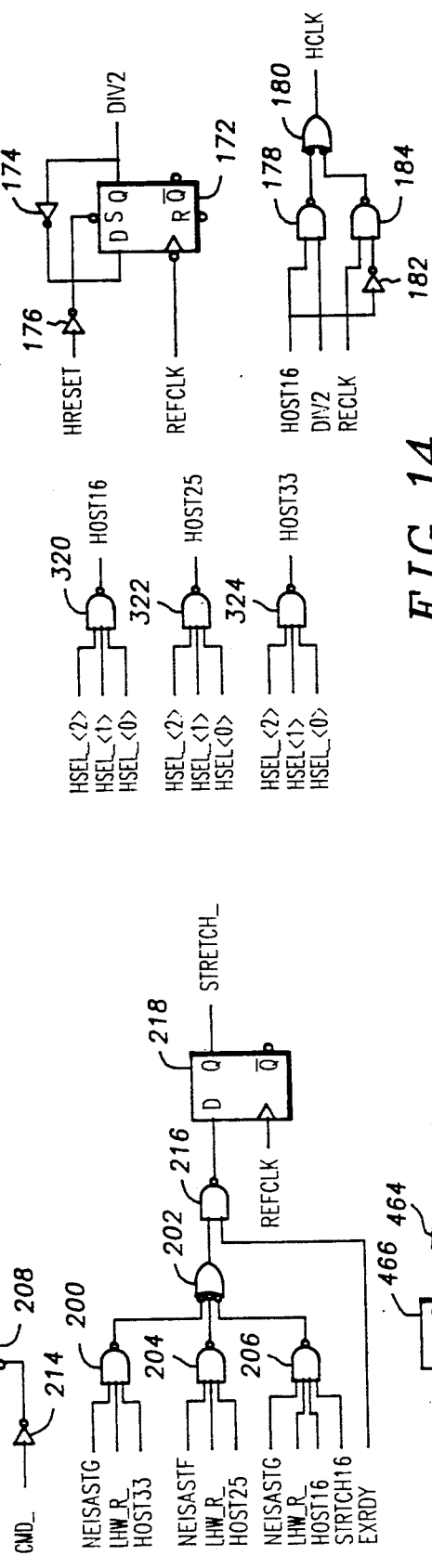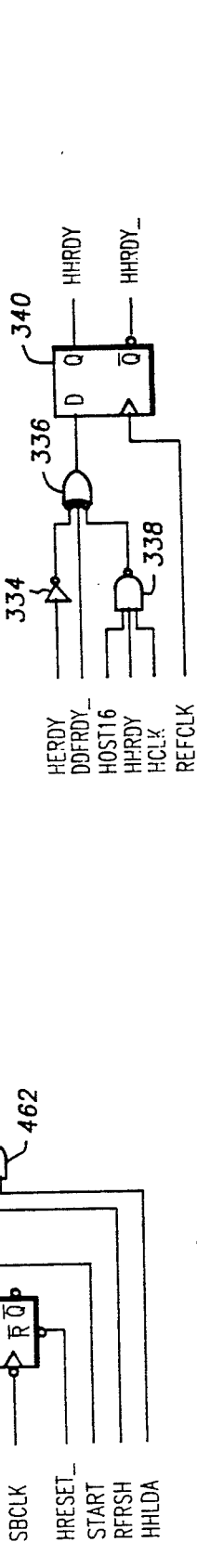

MULTIPLE INPUT FREQUENCY MEMORY CONTROLLER

BACKGROUND OF THE INVENTION

1. Field of the Invention

The invention generally relates to memory controllers utilized in computer systems, and more particularly, a single memory controller utilizing a plurality of input frequencies.

2. Description of the Related Art

The technology and capabilities of personal computer systems have generally been advancing at a fast pace for a number of years. However, the actual advancement of capabilities has not necessarily been uniform. For example, the capabilities and speeds of the microprocessor, the foundation of the personal computer, have dramatically increased in the last several years and appear to be continuing to increase at this high rate. On the other hand, a similar advancement curve has not been shown in memory devices, particularly in the effective speeds of memory devices, so that the disparity between the microprocessor speeds and the memory speeds has gotten larger. Further, other portions of the external constraints on a personal computer may also limit advancement in certain areas. For example, in many cases bus specifications were designed and developed for a particular time period, but as time progressed, devices which were much more powerful were developed. However, if those powerful devices were to be used in an interchangeable bus, such as one according to the ISA or Industry Standard Architecture, then some of the improvements could not be used and so designs can be standardized at lesser performance levels because of other limitations in the system.

One solution that has developed to these problems is the modular personal computer. In those designs many of the elements are located on interchangeable cards. For example, in most modular computers the processor system is located on an interchangeable card which can be readily replaced to allow the use of different microprocessors. Not only can types of microprocessors change but additionally so can the speeds of a particular microprocessor. For example, in many lines the Intel Corporation (Intel) 80386SX chip forms the low end either at 16 or 20 MHz versions, with a steady progression up through the compatible lines leading up to and ultimately concluding with 33 MHz or even 50 MHz 80486 microprocessors from Intel. By simply interchanging the processor card, the remaining components of the computer system can be reused and the theoretical cost of the performance increase is reduced.

However, there are certain disadvantages to this modular design. The most common disadvantage relates to the operation of the memory systems. In most high performance personal computers the memory is located on a bus which is tightly coupled to the processor and preferably is 32 bytes wide. The input/output (I/O) bus, such as the ISA or Extended Industry Standard Architecture (EISA) bus is wholly separate from this tightly coupled, proprietary bus. More details on the EISA bus are available in Appendix 1 in application Ser. No. 431,741, filed Nov. 3, 1989, which is hereby incorporated by reference. The I/O bus is effectively constrained because of the standardization that has developed over the years, but it is satisfactory for this portion of the system to remain relatively static because optimizations can be developed on the proprietary bus. Therefore, the main memory is located on this proprietary bus, called the host bus in some cases.

Because of the great differences in speeds and addressing techniques of the microprocessors used in modular systems, actual access to the memory devices varies greatly between the various microprocessors. However, the memory is located over a shared bus, so that in many cases the memory interface is fixed at a single variation, which is optimal for only one particular microprocessor and reduces performance in all other cases. Therefore, depending upon the configuration of the computer system, overall system performance can often be increased only at levels much less than that theoretically possible based on just the change of capabilities from one microprocessor to another. The memory interface becomes a limiting factor, particularly as clock rates of the microprocessor change.

If the memory controller is located on the common system board used in modular designs or on the memory board itself, then it has been common that these particular limitation problems would automatically develop, because memory controllers are typically only single clock speed based devices. If the memory controller is actually located and interchangeable along with the processor card, then performance can be improved when the processor card is changed, but the design costs are increased because of the need to design a memory controller for each particular microprocessor. In addition, production volumes of the particular memory controller component would be reduced as compared to the situation where it was installed on the system board or on the memory board. Therefore, there are significant cost burdens when a memory controller is interchangeable with the processor card. A tradeoff must be made at design time between cost and performance, i.e. using a single memory controller for all systems or changing the memory controller with the processor card.

SUMMARY OF THE INVENTION

The computer system according to the present invention utilizes a memory controller capable of operating at a plurality of input frequencies as available for a series of different microprocessors in a modular computer, and yet providing effectively constant and high performance from the memory system. A synchronous, state machine-driven memory controller is preferably utilized, with certain states of the memory control operation being bypassed for given frequencies. In other cases, the memory controller operates at double the frequency of the general system clock when the frequencies are sufficiently close, so that again near optimal performance is obtained. Preferably the state machine is constructed such that events relative to the memory devices, such as the development of the row address strobe (RAS), column address strobe (CAS), and buffer output and latch signals are generally generated by the same states in the state machine, irrelevant of the input frequency. This simplifies external logic design and provides greater consistency in operation.

In the preferred embodiment the memory controller operates for three system frequencies, namely 16, 25 and 33 MHz effective processor speed. Therefore a single memory controller can be utilized to allow reduction of costs and simplifications of designs and yet high levels of performance can be achieved from the memory subsystem, the memory interface effectively being tailored for each particular microprocessor.

BRIEF DESCRIPTION OF THE DRAWINGS

A better understanding of the present invention can be obtained with the following detailed description of the preferred embodiment is considered in conjunction with the following drawings, in which:

FIGS. 9, 10, 11, 12, 13, 14, 15, 16 and 17 are schematic illustrations of logic associated with the various state machines to produce the various signals necessary for operation of the memory subsystem.

DETAILED DESCRIPTION OF THE PREFERRED EMBODIMENT

Figure 1:
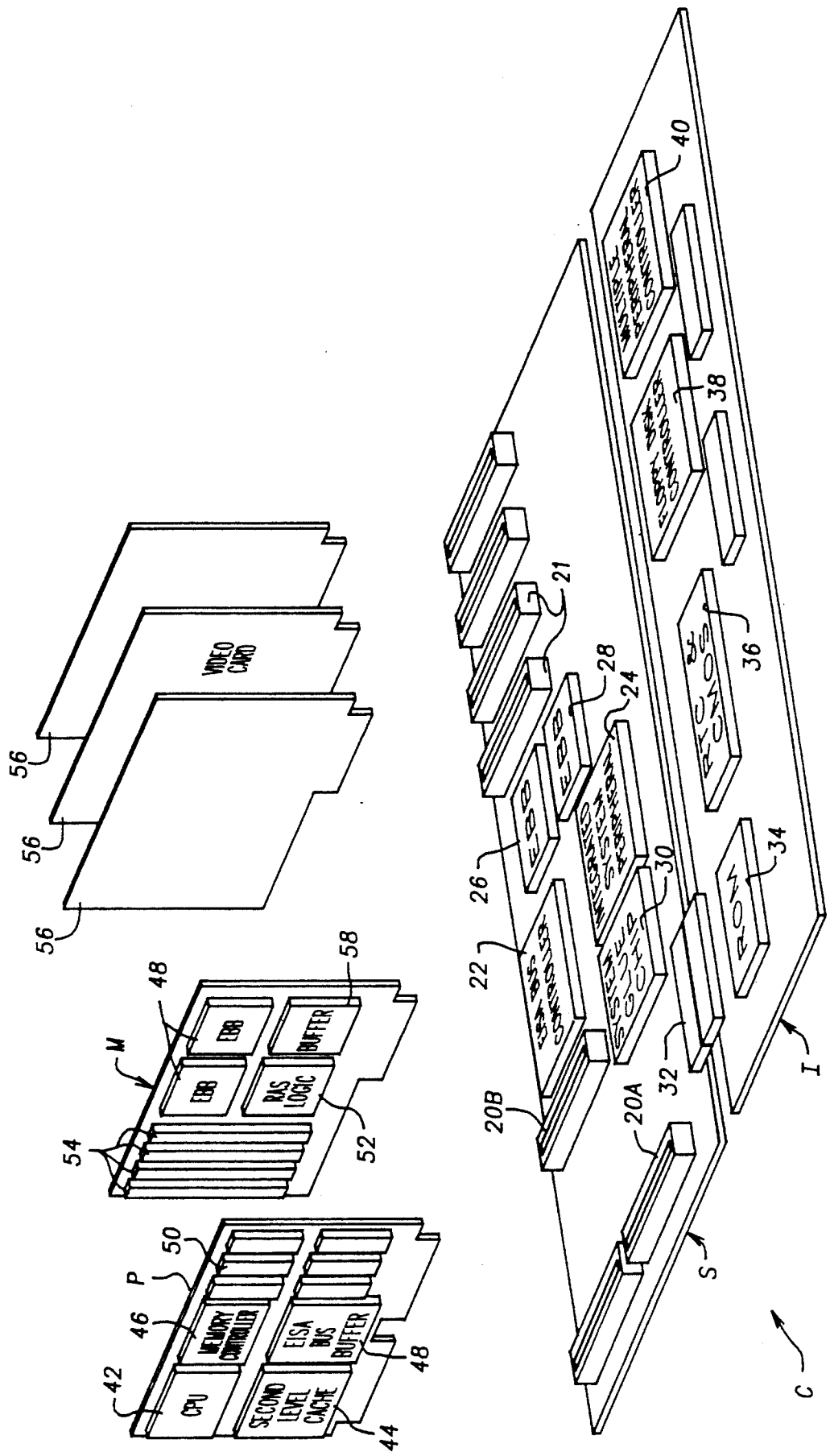
FIG. 1 is an exploded, perspective illustration of a modular computer system incorporating a memory controller according to the present invention.

A modular computer system generally referred to by the letter C is shown in FIG. 1. A system board S contains a number of devices and a series of connectors or slots 20. The circuitry located on the system board S includes items which are very fundamental and not likely to change without drastic change in the operation of the computer system C. For example, a bus controller 22 to control operations on the input/output (I/O) bus, such as the EISA bus, is located on the system board S. Related to the bus controller 22 is an integrated system peripheral (ISP) 24 which contains the interrupt controller, various timers, the direct memory access (DMA) controller, non-maskable interrupt logic refresh and EISA bus arbitration and prioritization logic. In addition, various data latches/buffers and address latches/buffers 26 and 28 are provided to couple to the EISA bus. Further, a random logic chip 30, commonly referred to as a system glue chip (SGC), is provided to reduce the overall space and component count of the system board S.

Connected to the system board S by a connector 32 is an I/O board I. The I/O board I contains certain input/output related functions and other functions as commonly developed on the X bus of a personal computer system according to the ISA or EISA architecture. For example, the read only memory (ROM) 34 is located on the I/O board I. Additionally the real time clock (RTC) and CMOS memory unit 36, the floppy disk controller (FDC) 38 and a multiple peripheral controller (MPC) 38, which incorporates two serial ports, a parallel port and a hard disk interface, are also located on the I/O board I. Further, a keyboard controller (not shown) is located on the I/O board I. These functions are preferably located on a separate board to allow this unit to be interchanged as desirable. For example, various I/O improvements could be developed, such as an improved audio section, a network interface and other variations, and therefore it is possible to replace the I/O board I with a newer enhanced version without thereby also requiring the change of the system board S as would conventionally be done.

In the computer system C according to the preferred embodiment, a processor card P is also located in an interchangeable slot. The processor card P contains the central processing unit or microprocessor 42 and miscellaneous related support logic 44. Further, the processor card P contains a memory controller 46 according to the present invention and a data buffer/latch 48. Additionally in the preferred embodiment, an amount of base memory 50 is preferably located on the processor board P, in the preferred embodiment 4 Mbytes of memory. This memory 50 is utilized with the buffer/latch 48 and is directly controlled by the memory controller 46. However, because of the limitations of space and the number of complex components on the processor board P is also desirable that a separate memory board M be located in an interchangeable slot 20. The memory board M preferably contains a pair of data buffers/latches 48. Additionally, RAS logic 52 and various other buffering logic 53 is located on the memory board M. Finally, a series of locations 54 for receiving memory are provided on the memory board M. Preferably the locations 54 are designed to receive single in-line memory modules (SIMMs), preferably up to eight SIMMs in the preferred embodiment. This allows memory expansion to be easily developed on the memory board M. The control signals for the memory board M must be transmitted from the memory controller 46 on the processor board P through the system board S and up to the memory board M.

The computer system C also may contain a plurality of input/output related interchangeable cards. For example in the system shown in FIG. 1, one of the interchangeable cards 56 preferably is a video card which is interconnected with a monitor. Numerous other cards can be installed as is conventional. Thus in the particular embodiment shown in FIG. 1, the memory controller 46 is changed with each particular processor card P and is not located on the system board. This would conventionally allow very high optimization of the memory controller for the particular processor but would result in reduced production volumes and increased designed times. However, the memory controller according to the preferred embodiment is utilized on a series of different processor cards P so that volume increases and effective design time is reduced.

Figure 2:
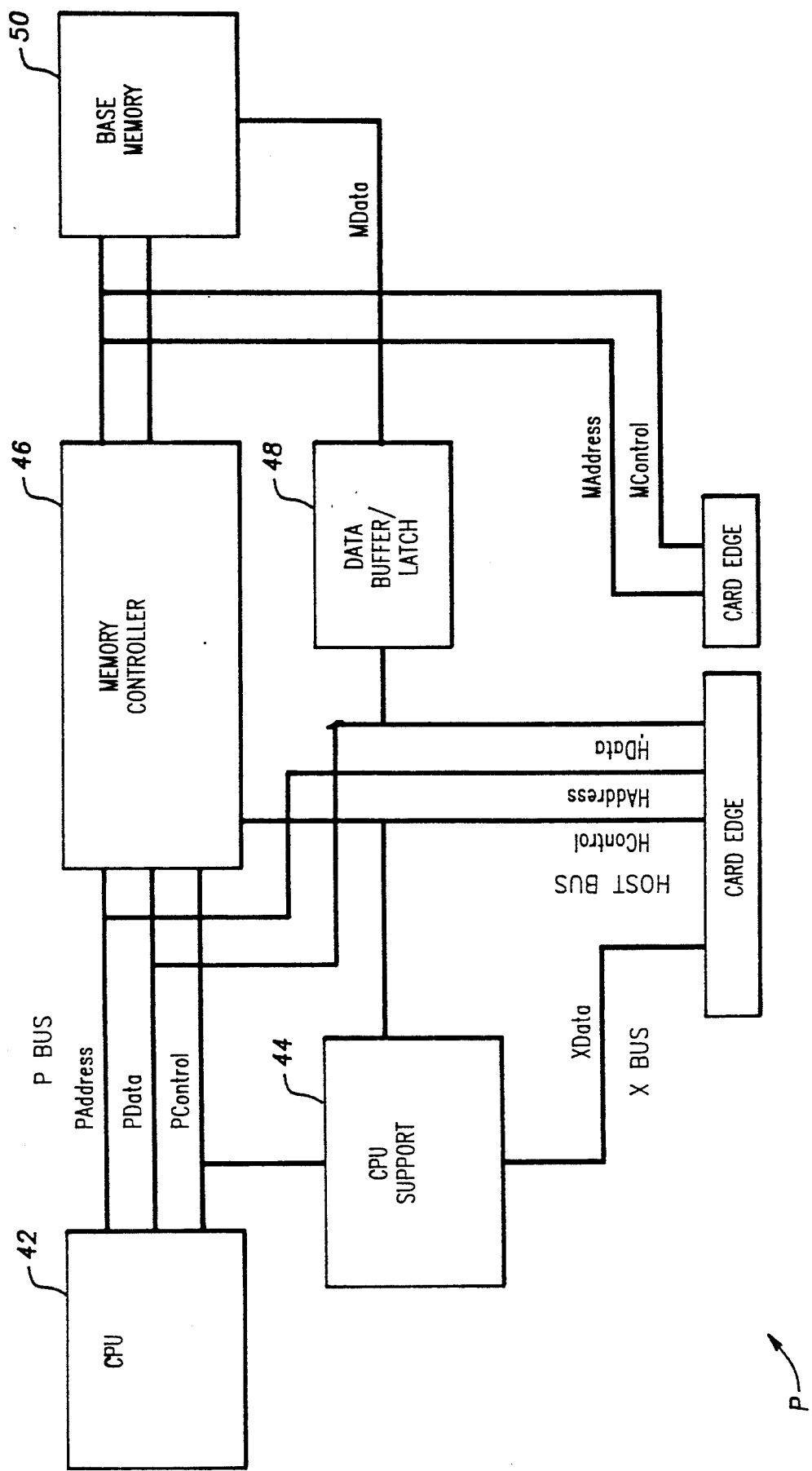
FIG. 2 is a block diagram of a processor board incorporating a memory controller according to the present invention.

A block diagram of the processor card P is shown generally in FIG. 2. The CPU or microprocessor 42, preferably is one of the 80836/82395 microprocessor and cache controller pair, the 16 MHz or 25 MHz 80486SX microprocessor or the 33 MHz 80486DX microprocessor from Intel Corporation. The CPU 42 provides a series of signals referred to as the P bus, with the P bus including the PA address lines, PD data lines and the PC control lines. A series of these lines are converted to the HA host address and HD host data lines which form a host or proprietary H bus. The memory controller 46 utilizes the processor control bus PC and develops the HC or host control bus. Various CPU support logic 44 is connected to the control buses PC and HC and receives a bus referred to as the XD data bus. The CPU support logic 44 provides the miscellaneous registers and support functions necessary for operation of the computer system C. The memory controller 46 also provides as outputs the memory address and memory control or MA and MC buses. These are provided to the base memory 50 and externally for transmission to the memory board M. The base memory 50 receives the MD or M memory data bus which is connected to the data buffer/latch 48. The data buffer/latch 48 is also coupled to the host data bus HD to allow data transfer between the MD and HD buses.

Figure 3:
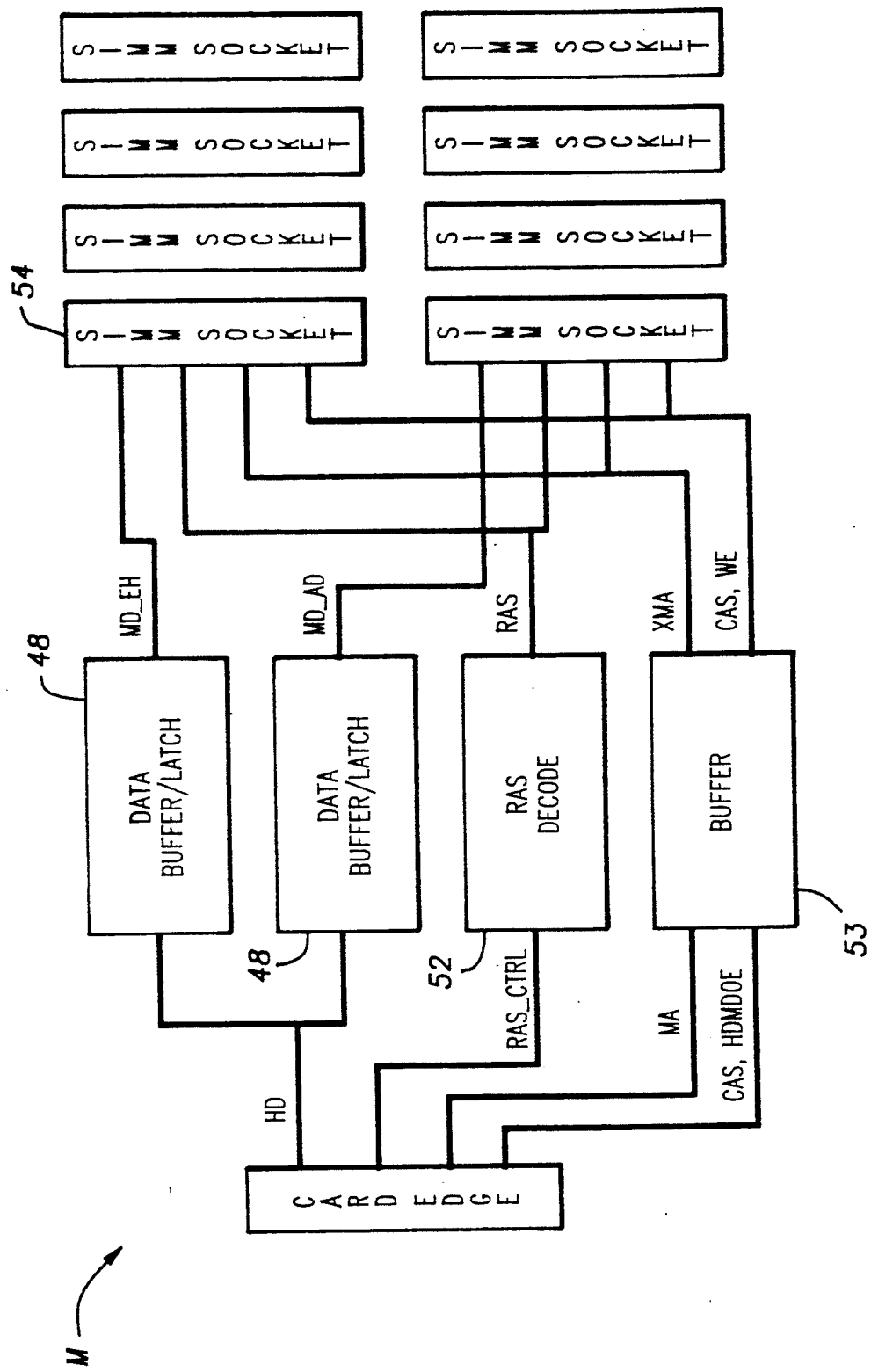
FIG. 3 is a block diagram of a memory board for use with the processor board of FIG. 2.

The memory board M is shown in more detail in the block diagram of FIG. 3. The HD bus is provided to the buffer/latches 48, which are preferably each 32 bits wide. This produces a 64 bit wide memory card, when the multiplexing of the data buffer/latches is considered and allows for interleaving of the memory devices. Various of the control lines from the M control bus are provided to the RAS logic 52 and to the various buffers and conversion logic 53. In addition, the buffer logic 53 buffers the MA or memory address bus. The various data, address, RAS, CAS and write enable signals are provided from the buffer/latches 48, the RAS decode logic 52 and the buffer 53 to the plurality of SIMM locations 54 where the actual memory devices on the memory board M are located.

Figure 4:
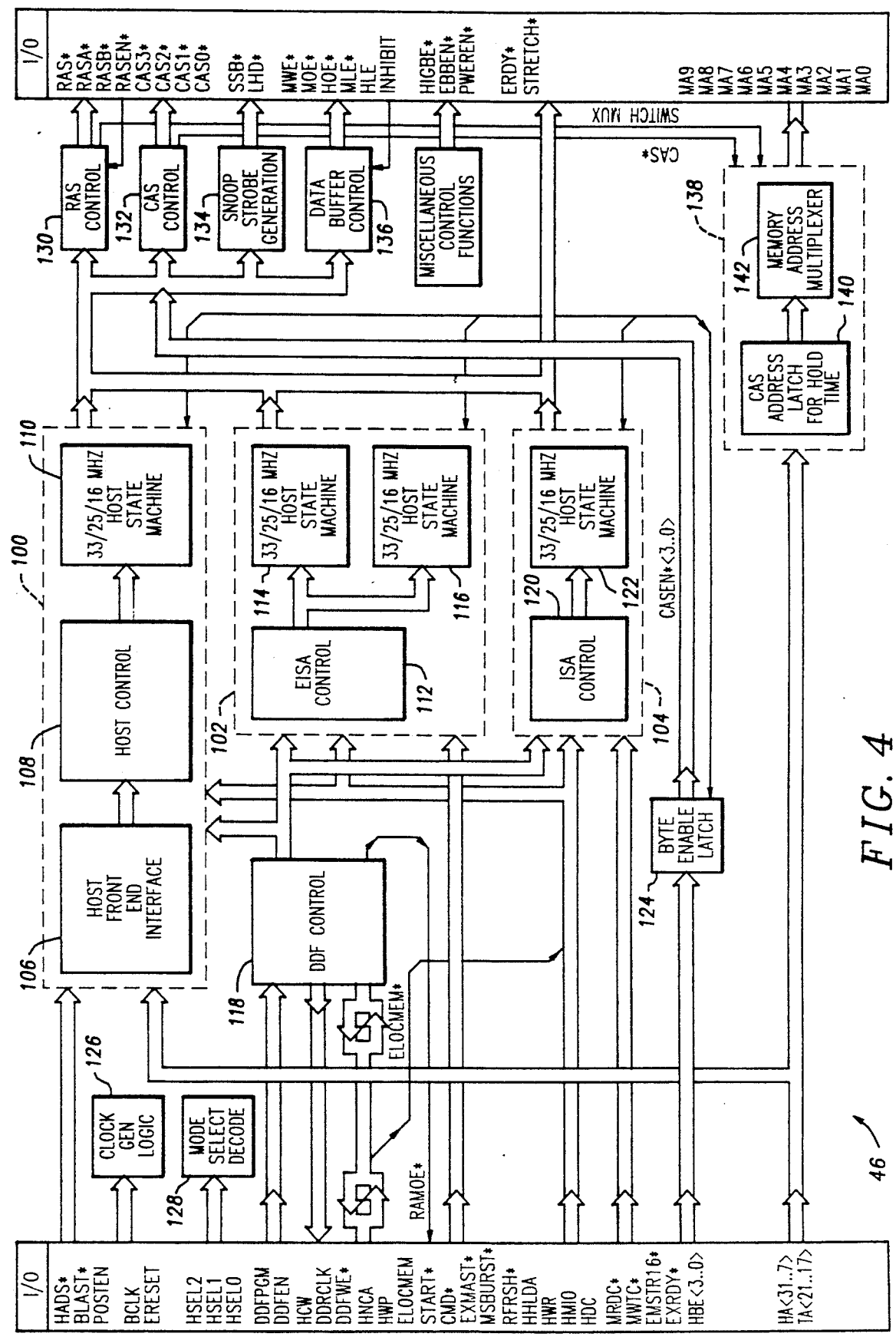
FIG. 4 is a block diagram of a memory controller according to the present invention.

More details of the memory controller 46 are provided in FIG. 4. There are three main memory control blocks 100, 102 and 104 in the memory controller 46. The block 100 is the block which interfaces primarily between the host bus H and the memory devices; while the block 102 is the EISA block, which interfaces between the EISA bus specific signals and the memory devices. The block 104 is the ISA interface block which converts between the ISA standard signals and the memory devices.

The host block 100 includes a host front end interface 106 which receives various status signals from the host bus H and the various host bus addresses. A page hit detector is located in the host front end interface 106 to allow page mode operation of the memory devices. The host bus front end interface 106 is connected to a host control block 108 which provides certain logic to develop signals necessary for a host state machine 110. Pertinent signals developed by the host control logic 108 will be discussed in the operation of the host state machine 110.

Similarly, the EISA block 102 contains EISA control logic 112 which translates certain signals as necessary for use by an EISA state machine 114 and a refresh state machine 116. One input to the EISA block 102 is provided by the DDF or data destination facility control block 118. The DDF system is a memory translation and module addressing system and is more fully described in U.S. patent application 431,666 filed Nov. 3, 1989 and in its European Patent Office counterpart having an application number of 90 311 749.7 and a filing date of Oct. 26, 1990, which was published on May 8, 1991, both of which are hereby incorporated by reference.

The ISA block 104 includes ISA control logic 120 to develop necessary signals from the ISA signals and from the DDF control unit 118 and to provide these signals to an ISA state machine 122.

A byte enable latch 124 latches the byte enable signals as generally developed in Intel microprocessors and as available on the host bus H. The memory controller 46 also contains clock generation logic 126 which receives a reference clock signal, the BCLK or bus clock signal from the EISA bus and the system reset signal. In addition, mode select decode logic 128 receives three select signals to determine the particular operating frequency of the system.

The four state machines 110, 114, 116 and 122 provide their outputs to a series of logic blocks such as the RAS control logic 130, the CAS control logic 132, snoop strobe logic 134 and data buffer control logic 136. The RAS control logic 130 develops the row address strobe (RAS) signals provided to the memory board M and used on the processor board P. The CAS control logic utilizes the output of the byte enable latch 124 and develops the particular column address select (CAS) signals used by the memory devices. The snoop strobe logic 134 develops a signal which is provided to the various cache systems on the CPU 42 to indicate when snooping of the address bus is appropriate for cache coherency reasons. The data buffer control logic 136 provides the various write enable, output enable and latch enable signals used with the memory devices and the various data buffers/latches 48.

The memory addresses on the HA bus and as developed by the DDF system are provided to an address block 138, which includes a CAS address latch 140 and a memory address multiplexer 142. The CAS address latch 140 is utilized because the addresses on the host bus HA may be removed prior to the completion of the cycle. Therefore latching is necessary. The memory address multiplexer 142 develops the row and column addresses from the full address provided on the HA bus and by the DDF system. The addresses provided by the memory address multiplexer 42 are the MA address lines provided on the MA bus.

Figure 5:
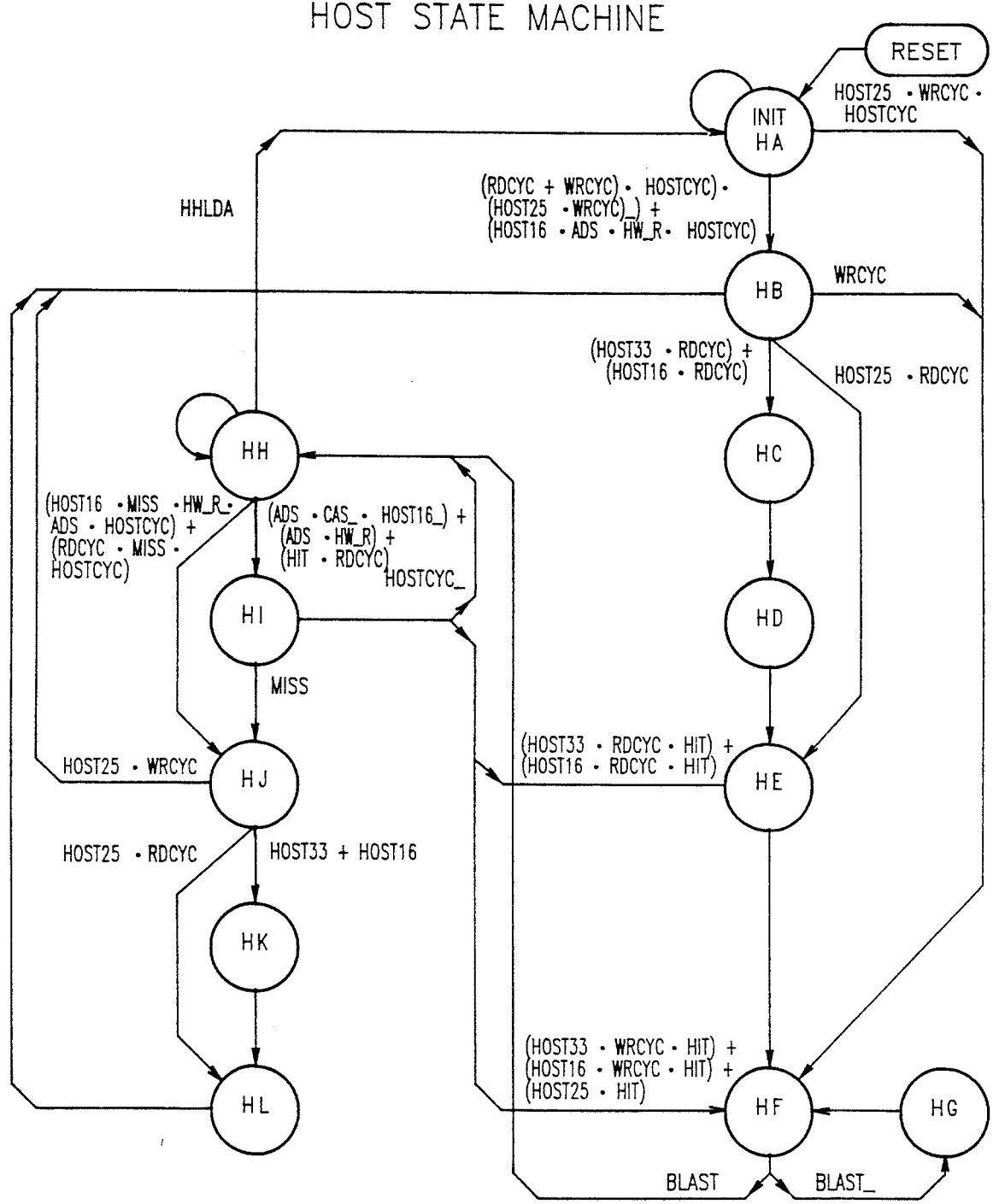
FIGS. 5, 6, 7 and 8 are state machines illustrating operation of portions of the memory controller of FIG. 4.

The logical flow of the host state machine 110 is shown in FIG. 5. The host state machine 110 is capable of operating with 16 MHz, 25 MHz and 33 MHz system operating frequencies and is designed to work with page mode DRAMs. The host state machine 110 provides initial cycles, page hit cycles and page miss cycles. In addition, the host state machine 110 is designed to cooperate with the various burst cycles produced by the CPU 42. The host state machine 110 is clocked by a signal referred to as REFCLK, which is 32 MHz for 16 MHz system operation, 25 MHz for 25 MHz system operation and 33 MHz for 33 MHz system operation. Upon reset, control initiates at host state machine state HA. This is the initial state and a rest state. In the state machines of FIGS. 5, 6 and 7 and the accompanying schematic diagram the signal mnemonic or state followed by an underline is the inverse of the same signal mnemonic or state without the underline. Additionally, the dot in the state machines of FIGS. 5, 6 and 7 indicates the logical AND operation, while the + signal indicates the logical OR operation.

Control proceeds from state HA to state HF if 25 MHz operation is selected, as indicated by the HOST25 signal being high; a write cycle is occurring, as indicated by the WRCYC signal being true; and the operation is being performed by the CPU 42 to the memory located on the processor card P or the memory card M, the host bus memory, as indicated by the true state of the HOSTCYC signal. Control proceeds from state HA to state HB for read or write cycles being performed by the CPU 42 on the host bus H which are not 25 MHz write cycles or if 16 MHz operation is indicated, a host cycle is occurring as indicated by the HOSTCYC signal, a write cycle is commencing as indicated by the HW_R signal and an address status pulse is occurring as indicated by the ADS signal. For all other cases, control remains at state HA.

Control proceeds from state HB to state HF for write cycles. If the pending cycle is a read cycle, as indicated by the RDCYC signal being high or true, and either 33 or 16 MHz operation is indicated by the HOST33 or HOST16 signals being true, control proceeds to state HC. Control proceeds from state HC to state HD and then to state HE on successive REFCLK signal rising edges. If 25 MHz operation is indicated and a read cycle is occurring, control proceeds directly from state HB to state HE, thereby bypassing states HC and HD. Control proceeds from state HE to state HF.

Control proceeds from state HF to state HG if this is not the last transfer in a burst series of transfers, as indicated by the BLAST_signal being high. Control proceeds from state HG to state HF. This state HF to state HG loop forms the burst loop and operates the memory devices in page mode due to the definition of a burst operation.

Control proceeds from state HF to state HH if this is the last operation in a burst operation as indicated by the BLAST signal being true. Control proceeds from state HH to state HI if the ADS signal is active, a column address strobe is not being provided and operation is not indicated at 16 MHz; if the ADS signal is true and a write cycle is commencing as indicated by the HW_R signal being true; or if a memory page hit has occurred and this is a read cycle. Control proceeds from state HH to state HJ if 16 MHz operation is indicated, the operation is a read page miss, the ADS signal is true and the operation is being performed by the CPU 42 on the host bus H; or if the operation is a read miss cycle to the host bus memory by the CPU 42. If the HHLDA signal is asserted, indicating that the CPU 42 does not have control of the host bus H, control returns to state HA to set up an initial operation. In all other cases control loops at state HH, the second idle or reset state.

Control proceeds from state HI to state HJ if a page miss operation is indicated. Control proceeds from state HI back to state HH if the operation in progress is not indicated as being to host bus memory by the CPU 42. Control proceeds from state HI to state HE if 33 or 16 MHz operation is indicated, a read cycle is in progress and it is a page hit. Control proceeds from state HI to state HF for all 25 MHz operation hit cases and for 16 and 33 MHz write cycle hits.

Control proceeds from state HJ to state HB for 25 MHz write cycles. Control proceeds from state HJ to HK for all 16 and 33 MHz operations. Control proceeds from state HK to state HL in all cases. Control proceeds from state HJ directly to state HL, bypassing state HK, for 25 MHz read cycles. Control proceeds from state HL to HB in all instances. Thus the host state machine 110 compensates for the different operating frequencies and fixed memory device timing to produce optimal memory cycles.

Figure 6:
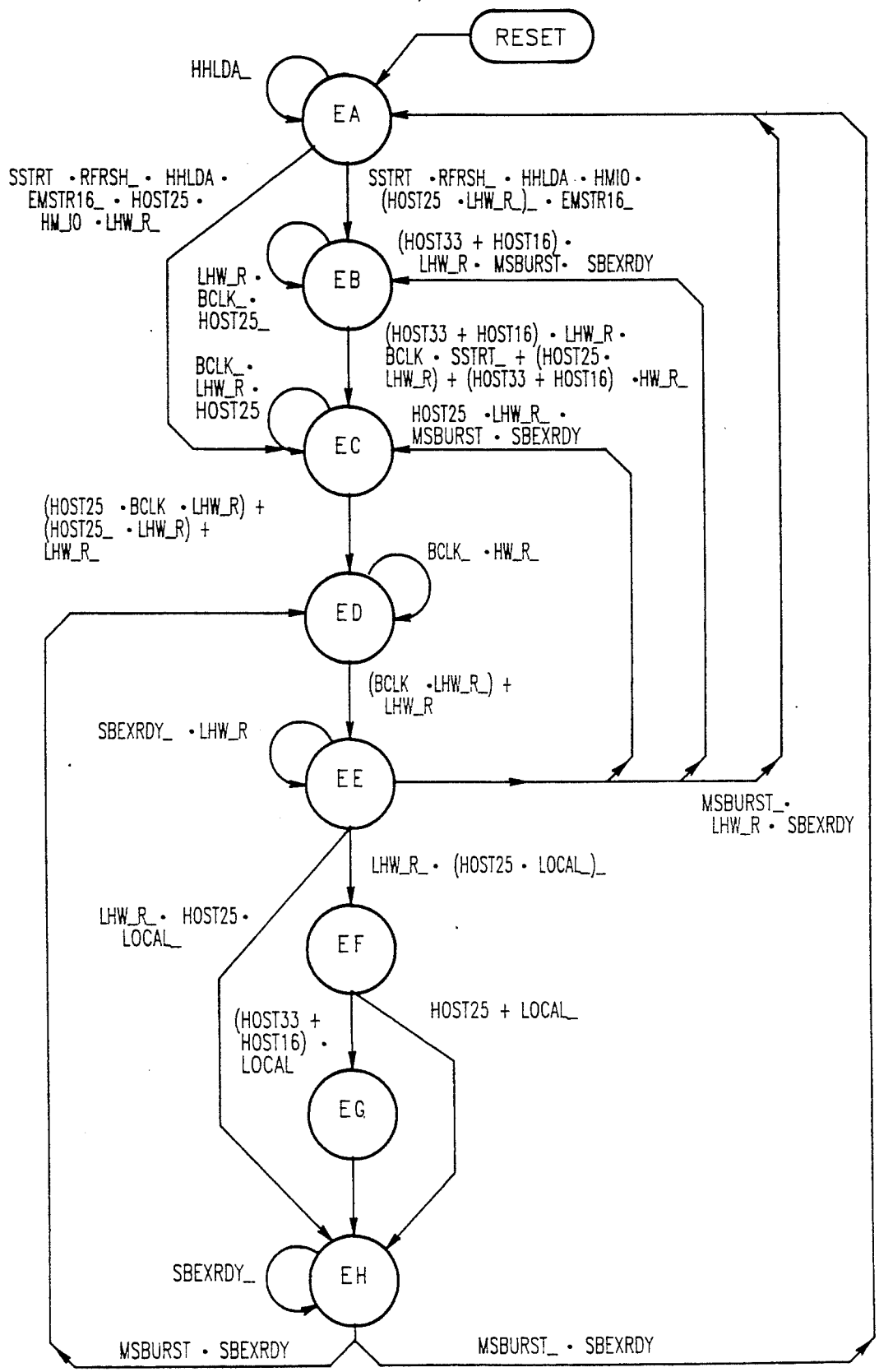

The EISA master state machine 114 is shown logically in FIG. 6. The state machine 114 is clocked by the REFCLK signal but is also in many cases interlocked with the BCLK signal so that it is properly synchronized with the EISA bus. Upon computer system C reset, control starts at state EA. While the HHLDA signal is low, indicating that the CPU 42 is in control of the host bus H, control remains in state EA. Control also remains at state EA for all conditions not specified in transfers to states EB or EC. If the CPU 42 is not in control of the host bus; a refresh cycle is not occurring; a memory cycle is occurring; the cycle is starting; a 16 bit ISA master is not in control of the EISA bus as indicated by the EMSTR16_signal provided from the bus controller 22; and 25 MHz read operations are not occurring, control proceeds from state EA to state EB. Control remains in state EB if a write operation is occurring, as indicated by the LHW_R or latched host write signal; the BCLK signal is low and 16 or 33 MHz operation is indicated and any other cases not indicating a transfer to state EC. If either 16 or 33 MHz operation is indicated, the LHW_R or latched HW_R signal indicates that a write operation is occurring, the BCLK signal is high and this is not the start of a sequence as indicated by the synchronized not START or SSTRT_signal being true; if 16 or 33 MHz operation is indicated and a read operation is occurring; or for all 25 MHz write operations, control proceeds from state EB to state EC. Control proceeds from state EA to state EC when a cycle is starting, it is not a refresh cycle, the CPU 42 is not in control, a 16 bit ISA master is not in control, 25 MHz operation is indicated, a memory operation is occurring and it is a read cycle. Control remains in state EC while the BCLK signal is low and a write operation is occurring for 25 MHz operation. In all other cases control proceeds from state EC to state ED.

Control remains in state ED during read operations when the BCLK signal is in a low state. At other times, that is when the BCLK signal is high during read operations or in all write operations, control proceeds from state ED to state EE. Control remains in state EE when the synchronized EXRDY or SBEXRDY signal is not true, indicating that a delay or wait state is necessary, and a write cycle is occurring. Control proceeds from state EE to state EC for 25 MHz operation write cycles which are bursts, as indicated by the MSBURST signal being active, and a ready state is indicated. Control proceeds from state EE to state EB for 33 or 16 MHz operations which are writes, bursting and ready. For write, non-burst operations with the memory indicating ready, control proceeds from state EE to state EA.

Control proceeds from state EE to state EF for read operations which are being performed in 16 or 33 MHz operation or are not to the memory on the host bus H. Control proceeds from state EE to state EH for 25 MHz operation, non-host bus reads. Control proceeds from state EF to state EG for 16 or 33 MHz operations which are being performed to the host bus H. Control proceeds from state EG to state EH. Control proceeds directly from state EF to state EH for cases which are either 25 MHz operation or not to the host bus memory. Control remains at state EH while the EISA bus is indicated as not being ready by the SBEXRDY_signal being true. When the bus becomes ready and it is not a burst operation, control returns to state ED from state EA. Alternatively, if a burst operation is indicated, control proceeds from state EH to state ED. Thus the EISA state machine 114 also compensates for the varying system operating speeds.

Figure 7:
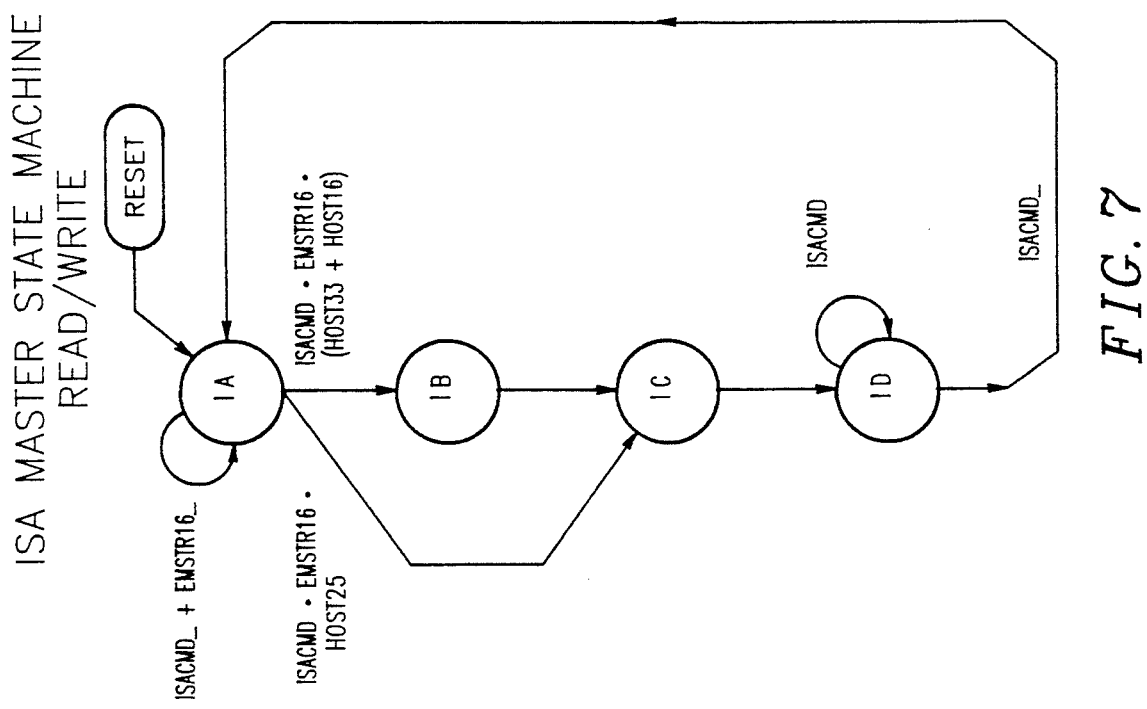

Operation of the ISA state machine 122 is shown in FIG. 7. The ISA state machine 122 is also clocked by the REFCLK signal. Upon reset of the computer system C, control proceeds to state IA. Control remains at state IA while a signal referred to as ISACMD_is true, indicating that an ISA memory read or write operation is not occurring, or if a 16 bit ISA master is not operating. If an ISA memory read or write command is in progress, a 16 bit ISA master is in control and either 16 or 33 MHz operation is indicated, control proceeds from state IA to state IB. Control always proceeds from state IB to state IC. If an ISA command is active and being provided by a 16 bit ISA master and 25 MHz operation is indicated, control proceeds from state IA directly to state IC. Control proceeds from state IC to state ID. Control remains at a state ID while the ISA memory read or write command is in progress. Control proceeds from state ID to state IA when the ISA command is completed.

Figure 8:
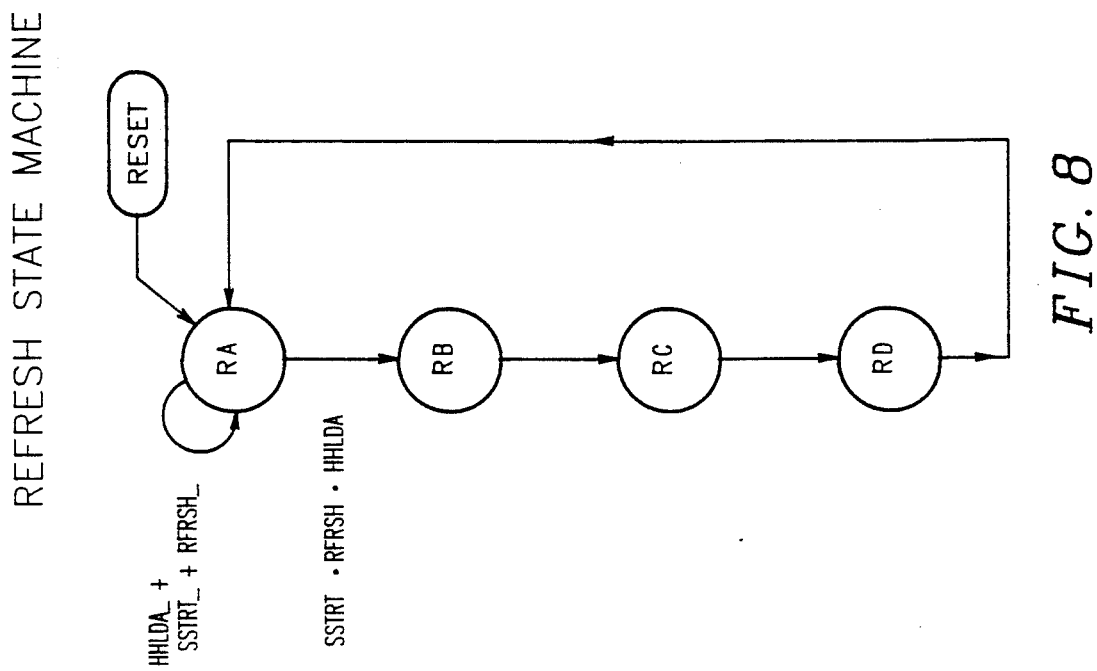

Operation of the refresh state machine 116 is shown in FIG. 8. The refresh state machine 116 is clocked by the REFCLK signal. Upon system reset, control proceeds to state RA. Control remains in state RA while the CPU 42 is in control of the host bus H, an EISA cycle has not commenced as indicated by the SSTRT_signal being true or a refresh cycle is not occurring. If the CPU 42 is not in control of the host bus H, an EISA cycle has started, and it is a refresh cycle, control proceeds from state RA to state RB. Control then proceeds consecutively on REFCLK signal rising edges from state RB to RC to RD and returns to state RA. Thus it is noted that the refresh state machine is not frequency dependent.

As indicated in the block diagram of FIG. 4, miscellaneous logic is needed with the state machines 110, 114, 116 and 122 to develop the necessary signals both to drive the memory devices and the buffers and for development and control of the state machines.

Referring to FIG. 14, the clock dividing circuitry is shown. For 16 MHz system operation, a 32 MHz REFCLK signal is provided, while for 25 MHz operation the REFCLK signal is 25 MHz and for 33 MHz operation the REFCLK signal is 33 MHz. For 25 and 33 MHz cases the REFCLK signal can be used directly as the HCLK signal, which is provided to the host bus H as the master clock signal, while for the 16 MHz operation the REFCLK signal must be divided by two. This is done by the D-type flip-flop 172, which has the REFCLK signal providing the clocking signal. The non-inverted output is connected to the input of an inverter 174, whose output is connected to the D input. The HRESET signal, the system reset signal, is provided to an inverter 76, whose output is connected to the inverted set input of the flip-flop 172 for synchronization purposes.

The HOST16 signal, indicating 16 MHz operation, and the non-inverted output of the flip-flop 172 are the inputs to a two input NAND gate 178. The output of the NAND gate 178 is connected to one input of a two input NAND gate 180. The HOST16 signal is provided to an inverter 182, whose output is connected to one input of a two input NAND gate 184. The REFCLK signal provides the second input to the NAND gate 184, whose output is connected to the second input of the NAND gate 180. The output of the NAND gate 180 is the HCLK signal.

Referring now to FIG. 9, certain miscellaneous logic is shown which is used to develop some signals. For example, one signal which is developed for certain EISA read operations is the STRETCH_signal, which is provided to the bus controller 22 so that a full BCLK signal wait state need not be applied, thus allowing a slight delay in memory operations without the full delay developed by a full wait state. For 33 MHz operation the HOST33 signal is provided as one input to a three input NAND gate 200. The LHW_R_signal, which indicates a read operation, is provided to a second input of the NAND gate 200, while the final input is a signal referred to as NEISASTG, which indicates that the next state of the EISA state machine 110 is state EG. The output of the NAND gate 200 is provided as one input to a three input NAND gate 202. The second input to the NAND gate 202 is provided by the output of three input NAND gate 204 which is used for the 25 MHz condition. The inputs to the NAND gate 204 are the HOST25 signal, the LHW_R_signal and a signal referred to as NEISASTF or EISA state machine next state EF signal. The third input to the NAND gate 202 is provided by the output of four input NAND gate 206. The inputs to the NAND gate 206 are the HOST16 signal, the LHW_R_signal, the NEISASTG signal and a signal referred to as STRTCH16. The STRTCH16 signal is developed at the inverted output of a D-type flip-flop 208. Two buffers 210 and 212 are connected from the STRTCH16 signal to the D input of the flip-flop 208. The inverted clock input of the flip-flop 208 is the SBCLK or synchronized BCLK signal. The CMD_signal from the EISA bus is provided to an inverter 214, whose output is connected to the inverted reset input of the flip-flop 208. Therefore the STRTCH16 signal toggles on BCLK signal falling edges during burst operations at 16 MHz systems. This is because a full delay is not necessary in each particular cycle and thus performance can be increased in this manner.

The output of the NAND gate 202 is provided as one input to a two input NAND gate 216. The second input to the NAND gate 216 is the EXRDY signal from the EISA bus, which indicates that operations are ready to proceed. The output of the NAND gate 216 is provided to the D input of a D-type flip-flop 218. The REFCLK signal is provided to the clocking input of the flip-flop 218. The output of the flip-flop 218 is the STRETCH_signal which is provided to the bus controller 22 to indicate when a stretch of the BCLK signal should be developed.

Referring to FIG. 10, a signal indicated as EBBEN_is developed as the output of a D-type latch 220. The EBBEN_signal is provided to the local data buffer latch 48 present on the processor board P so that data can be provided from the memory devices 50 to the host bus 42. The RASEN_signal or not RAS enable signal is provided to the D input of the latch 220, while the IRAS or internal master RAS signal is provided to the input of a inverter 222 whose output is connected to the enable input of the latch 220.

Because the buffers 48 are bi-directional and have tristate outputs, output enable signals are necessary for each direction, that is from the memory data bus to the host data bus and from the host data bus to the memory data bus. The development of these signals is shown in FIG. 11. Additionally, FIG. 11 shows the development of the write enable signal which is applied to the memory devices. The RDCYC signal and the HOSTCYC signal are provided as the two inputs to a two input AND gate 230. The output of the AND gate 230 is provided to the D input of a D-type flip-flop 232. The REFCLK signal provided to the clocking input of the flip-flop 232, while the HRESET_signal is provided to the inverted reset input of the flip-flop 232 to cause it to be reset during system reset. The inverted output of the flip-flop 232 is provided as one input to a three input NAND gate 234. A second input to the NAND gate 234 is provided by the output of a two input NAND gate 236, whose inputs are the non-inverted output of a D-type latch 235 and the HDEISAEN signal, which is provided to indicate that data is to be transferred from the host data bus to the EISA bus. This signal is provided by the bus controller 22. The EISARD signal, which indicates an EISA read cycle, is provided to the D input of the latch 235, while the HDEISAEN signal is provided to the enable input. The third input to the NAND gate 234 is provided by the output of an inverter 238 whose input is the ISARD signal, which is developed from the various ISA signals present, particularly the MRDC_signal. The output of the NAND gate 234 is provided to one input of a two input NAND gate 240. The second input to the NAND gate 240 is provided by the HINHIBIT_signal. This signal is present to allow a writeback cache to be utilized with the memory controller 46. The HINHIBIT signal is developed during delays in conventional signals to allow the direction of travel of the host bus H to be reversed to allow the cache controller to writeback data into the memory system. The output of the NAND gate 240 is the MDHDOE_signal. Thus when this signal is active, the buffers 48 are transferring data from the memory devices to the host data bus.

The WRCYC signal and the non-inverted output of a D-type flip-flop 242 are provided as the two inputs to a two input NAND gate 244. The output of the two input NAND gate 244 is provided as one input to a two input NAND gate 246. The WRCYC and HOSTCYC signals are provided as the two inputs to a two input NAND gate 248, whose output is the second input to the NAND gate 246. The output of the NAND gate 246 is provided to the D input of the flip-flop 242. The REFCLK signal is provided to the clocking input, while the HRESET_signal is provided to the inverted reset input of the flip-flop 242. The inverted output of the flip-flop 242 is provided to one input of a three input NAND gate 250. The second input to the NAND gate 250 is provided by the output of a two input NAND gate 252. The HDEISAEN signal, which indicates that the buffers are transmitting from the host data bus to the EISA data bus, and the non-inverted output of a D-type latch 251 are the inputs to the NAND gate 252. The EISAWR signal, which indicates that an EISA write operation is occurring, is provided to the D input of the latch 251, while the HDEISAEN signal is provided to the enable input. The ISAWR or ISA write signal is provided to the input of an inverter 254 whose output is the third input to the NAND gate 250. The output of the NAND gate 250 is provided to an inverter 253 whose output is the HDMDOE_signal or the host data to memory data output enable signal. When this signal is low the outputs of the buffer 48 to the memory data bus are active.

The HDMDOE_signal is provided to the input of an inverter 260. The output of the inverter 260 is one input to a two input NAND gate 262. The LHWP_signal is the second input to the NAND gate 262. This signal when active low, indicates that the particular location is write protected, so that a write strobe is not developed even though data is being transferred to the data bus. The output of the NAND gate 262 is provided to the D input of a D-type transparent latch 264. The CAS_signal is provided to the enable input of the latch 264. The non-inverted output of the latch 264 provides the MWEO_or write enable signal to the memory devices, preferably 80 ns page node dynamic random access memories (DRAMs), such as those in SIMM modules such as the THM362500AS-80, the THM365120AS-80, the THM361020S-80, and the THM362020S-80 memory DRAMs manufactured by Toshiba. Thus the write enable signal is active during the CAS portion when data is being transferred from the host bus to the memory bus except to write protected locations.

In the like manner as there were two output enable signals for the two directions for the buffers 48, similarly there are also latch signals which are provided to the buffers 48 to latch in both directions. The development of the memory data to host data latch enable or MDHDLE_signal is shown in FIG. 12, while the development of the host data to memory data latch enable or HDMDLE_signal is shown in FIG. 13. The buffer/latches 48 are designed such that they are transparent when the latch enable signals are low and latch data on the rising edge of the latch enable signals.

Two signals referred to as HOSTSTE and HOSTSTG indicating the host state machine is in states HE or HG are provided to the inputs to a two input OR gate 276. The output of the OR gate 276 is provided as one input to a three input AND gate 278. The other two inputs to the AND gate 278 are the RDCYC signal, to indicate a read cycle, and the HOST25 signal, to indicate that 16 or 33 MHz operation. The output of the AND gate 278 is provided to the D input of a D-type flip-flop 280. The clock input of the flip-flop 280 receives the REFCLK signal, while the inverted reset input receives the HRESET_signal. The non-inverted output of the flip-flop 280 is connected to one input to a four input OR gate 282.

A signal referred to as HOSTSTF, to indicate that the host state machine is in state HF, is one input to a three input AND gate 284. The other two inputs to the AND gate 284 are the RDCYC signal and the HOST25 signal. The output of the AND gate 284 is provided to the D input of a D-type flip-flop 286, whose inverted clock input receives the REFCLK signal and whose inverted reset input receives the HRESET_signal. The output of the D-type flip-flop 286 is provided to one input of the OR gate 282.

The HOSTSTE and HOSTSTG signals are provided as the inputs to a two input OR gate 288, whose output is one input to a three input AND gate 290. The other two inputs of the AND gate 290 are the RDCYC and HOST25_signals. The output of the AND gate 290 is provided to the D input of a D-type flip-flop 292. The inverted clocking input is connected to the REFCLK signal and the inverted reset input of the flip-flop 292 is connected to the HRESET_signal. The non-inverted output signal of the flip-flop 292 is provided as a third input to the OR gate 282.

A signal referred to as the NEISASTD or EISA state machine next state ED signal is provided to the D input of a D-type flip-flop 294. The clock input of the flip-flop 294 receives the REFCLK signal, while the inverted input reset input receives HRESET_signal. The non-inverted output of the flip-flop 294 is provided as one input to a two input OR gate 296. The EISASTA or EISA state machine state EA signal is provided to the D input of a D-type flip-flop 298. The REFCLK signal is provided to the inverted clock input, while the HRESET_signal is provided to the inverted reset input. The non-inverted output of the flip-flop 298 is provided as the second input to the OR gate 296. The output of the OR gate 296 is one input to a three input NAND gate 300. The HHLDA and EMSTR16_signals are the two remaining inputs to the NAND gate 300. The output of the NAND gate 300 is provided to the input of an inverter 302. The output of the inverter 302 provides the fourth input to the OR gate 282. The output of the OR gate 282 is the MDHDLE_signal, which is provided directly to the input of the buffer/latch 48 as the active low latch enable signal. Thus the MDHDLE—signal is active as appropriate to latch the data from the memory devices.

Proceeding now to FIG. 13, the CAS—signal, which is active low when any individual CAS signal is being asserted, is provided to the input of an inverter 310. The output of the inverter 310 is provided as one input to a two input NOR gate 312. The HOSTSTF or host state machine state HF signal is provided to the D input of a D-type flip-flop 314. The inverted clocking input of the flip-flop 314 receives the REFCLK signal, while the inverted reset input receives the HRESET—signal. The non-inverted output of the flip-flop 314 is provided to the second input of the NOR gate 312. The output of the NOR gate 312 is the HDMDLE signal. An inverted form of this signal is provided to the active low latch enable input for the host data to memory data direction of the buffer/latch 48.

As previously noted, three select inputs are provided to the memory controller 46 to indicate speed of system operation. If all three of the select inputs are low, the output of an AND gate 320, the HOST16 signal, is high, indicating 16 MHz operation. If the select inputs provide a binary value of 001, the output of an AND gate 322, the HOST25 signal, is high, indicating that 25 MHz operation is provided. If the binary value of the three select bits is 010, this is an indication of 33 MHz operation and so the output of a three input AND gate 324, the HOST33 signal, is true or high. It is noted the HOST16, HOST25 and HOST33 signals are utilized throughout the operation of the memory controller 46 and allow distinguishing between the various processor speeds.

One operation of the memory controller 46 is to provide a READY signal back to the CPU 42 to indicate that data is available. This is provided according to the common characteristics of the Intel processors previously described. To this end, a READY signal is generated internally by the memory controller for host bus operations. The circuitry is shown generally in FIG. 15.

A signal referred to as HERDY or host bus early ready is provided to the input of an inverter 334. The HERDY signal is provided by the bus controller 22 one clock cycle before the end of the memory cycle is to be sampled. The output of the inverter 334 is connected to one input of a three input NAND gate 336. The DDFRDY—signal is provided as a second input to the NAND gate 336. This signal is provided when the DDF operation has completed. The HOST16 signal, the HHRDY signal and the HCLK or clocking signal on the host bus are provided as three inputs to a three input NAND gate 338. The output of the NAND gate 338 is the third input to the NAND gate 336. The output of the NAND gate 336 is connected to the D input of a D-type flip-flop 340. The REFCLK signal provides the clocking input for the flip-flop 340. The non-inverted output of the flip-flop 340 is the HHRDY or host bus ready signal while the inverted output is the HHRDY—signal which is provided on the host bus H and to the CPU 42.

Figure 16:
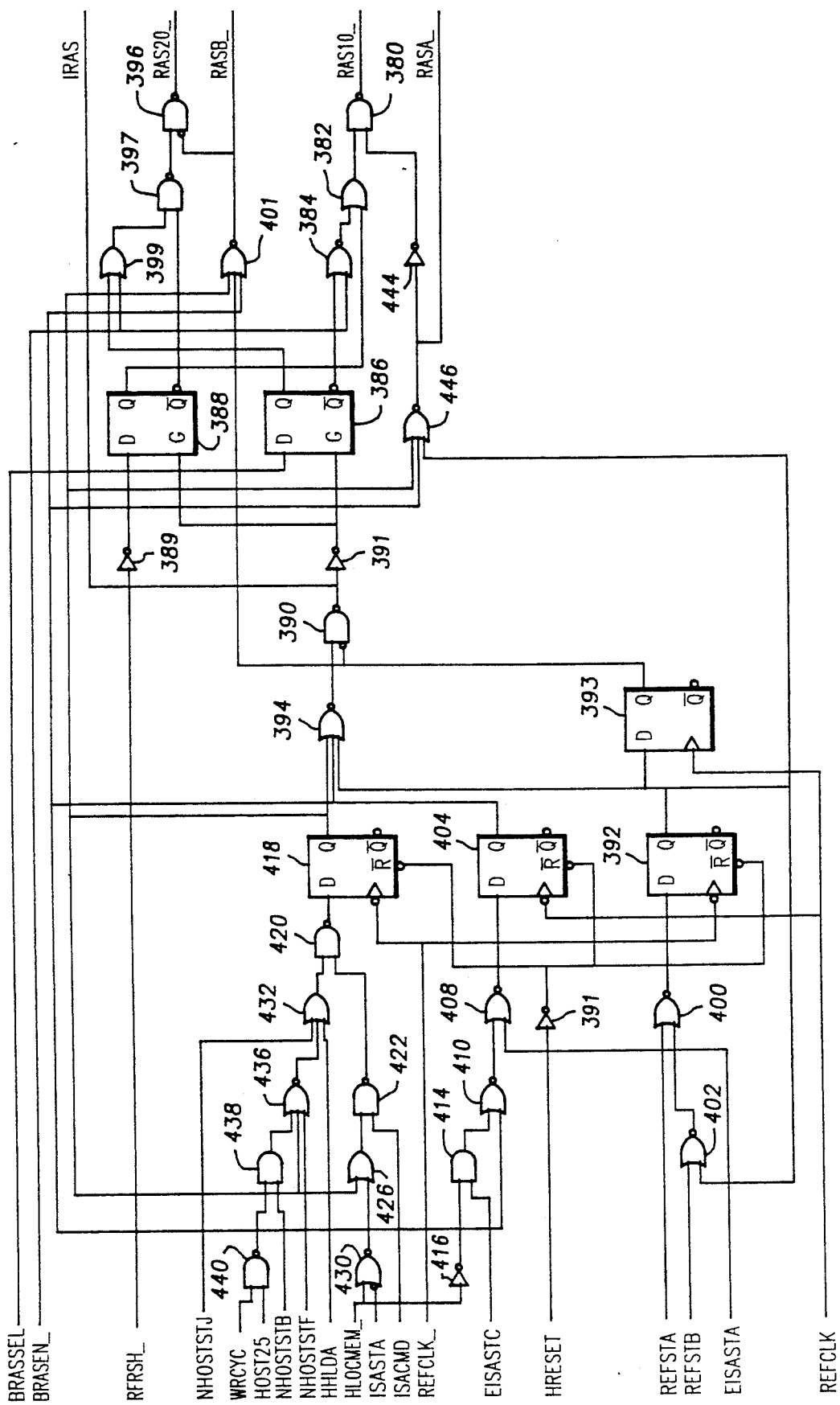

The RAS control logic 130 is shown generally in FIG. 16. Five outputs are provided by the RAS control logic 130. The outputs are the RAS10—, RAS20—, RASA—, RASB— and IRAS signals. The RASA— and RASB— signals are provided to the memory board M for combination with the various DDF signals to develop the proper module for selection. The RAS10— and RAS20— signals are utilized with the memory on the processor board P for 4 Mbyte and 8 Mbyte SIMMs.

The IRAS signal has been utilized in previous circuitry and is the internal master RAS signal which is active when any RAS signal is active.

Two input signals, BRASSEL and BRASEN—, are provided to indicate if the memory on the processor board P is enabled and if 4 Mbyte or 8 Mbyte SIMMs are being used. The BRASEN—and BRASSEL signals are provided by the DDF circuitry. If the BRASEN— signal is high or not active, then the processor board memory is disabled, except for receipt of REFRESH signals. If the BRASSEL signal is high, then the RAS1-0—signal may be active and the RAS20—signal is inactive. If the BRASSEL signal is low, then the RAS2-0—signal may be active and the RAS10—signal is inactive. This allows bank selection on 4 and 8 Mbyte SIMMs.

The RAS10—signal is provided by the output of a two input NAND gate 380. One input to the NAND gate 380 is provided by the output of a two input OR gate 382. One input to the OR gate 382 is the output of a two input NOR gate 384. The inverted output of a D-type latch 386 and the BRASEN—signals are the inputs to the NOR gate 384. The second input to the OR gate 382 is provided by the non-inverted output of a D-type latch 388. The D input of the latch 388 is connected to the output of an inverter 389, whose input is the RFRSH—or refresh active, when low, signal. The D input of the latch 386 receives the BRASSEL signal. The enable inputs of the latches 386 and 388 are provided by the output of an inverter 391, whose input is the IRAS signal which is provided as the output of a two input NAND gate 390. One input to the NAND gate 390 is inverted and receives its output from the non-inverted output of a D-type flip-flop 393. The D input of the flip-flop 393 is connected to the non-inverted output of a D-type flip-flop 392. The REFCLK signal is provided to the clock input of the flip-flop 393. The second input to the NAND gate 390 is developed by the output of a three input NOR gate 394.

One input to the NOR gate 394 is provided by the non-inverting output of the flip-flop 392. The REFCLK—signal is provided to the inverted clocking input of the flip-flop 392, while the inverted reset input receives the output of an inverter 398. The HRESET signal is provided to the inverter 398. The D-input of the flip-flop 392 is connected to the output of a two input NOR gate 400. One input of the NOR gate 400 receives the REFSTA or refresh state machine state RA signal. The second input to the NOR gate 400 is connected to the output of a two input NOR gate 402. The REFSTB or refresh state machine state RB signal is connected to one input of the NOR gate 402 while the second input is connected to the non-inverting output of the flip-flop 392.

The second input to the NOR gate 394 is provided by the non-inverting output of a D-type flip-flop 404. The inverted clock input of the flip-flop 404 receives the REFCLK signal, while the inverted reset input receives the output of the inverter 398. The D input of the flip-flop 404 is connected to the output of a two input NOR gate 408. One input of the NOR gate 408 receives the EISASTA or EISA state machine state EA signal, while the second input is connected to the output of a two input NOR gate 410. One input of the NOR gate 410 receives the non-inverted output of the flip-flop 404. The second input of the NOR gate 410 is connected to the output of a two input AND gate 414. One input to the AND gate 414 is the EISASTC or EISA state machine state EC signal, while the second input is connected to the output of an inverter 416. The HLOCMEM_ or host bus memory access signal, when low, is provided to the input of the inverter 416.

The final input to the NOR gate 394 is provided by the non-inverting output of a D-type flip-flop 418. The inverted clock input receives the REFCLK_signal, while the inverted reset input receives the output of the inverter 398. The D input to the flip-flop 418 is connected to the output of a two input NAND gate 420. One input of the NAND gate 420 is connected to the output of a two input NAND gate 422. One input to the NAND gate 422 receives the ISACMD or ISA cycle active signal. The second input of the NAND gate 422 is connected to the output of a two input OR gate 426. One input to the OR gate 426 is connected to the non-inverting output of the flip-flop 418. The second input of the OR gate 426 is connected to the output of a two input NOR gate 430. An inverted input of the NOR gate 430 receives the ISASTA or ISA state machine state IA signal. The second input of the NOR gate 430 is connected to the HLOCMEM_signal.

The second input to the NAND gate 420 is connected to the output of a three input OR gate 432. The NHOSTSTJ or host state machine next state HJ and HHLDA signals are provided to the OR gate 432. The third input to the OR gate 432 is connected to the output of a three input NOR gate 436. The output of a two input AND gate 438 is connected to one input of the NOR gate 436. The NHOSTSTB or host state machine next state HB signal is connected to one input of the AND gate 438, while the output of a two input NAND gate 440 is connected to the second input. The HOST25 and WRCYC signals are connected to the inputs of the NAND gate 440. The second input of the NOR gate 436 is connected to the non-inverted output of the flip-flop 418, while the third input receives the NHOSTSTF or host state machine next state HF signal.

The second input to the NAND gate 380 is provided by the output of an inverter 444. The input of the inverter 444 is the RASA_signal, which is provided as the output of a three input NOR gate 446. The inputs to the NOR gate 446 are the non-inverting output of the flip-flop 404, the non-inverted output of the flip-flop 392 and the non-inverted output of the flip-flop 418.

The RAS20_signal is developed at the output of a two input NAND gate 396. One input of the NAND gate 396 is connected to the output of a two input NAND gate 397. One input of the NAND gate 397 is connected to the inverting output of the latch 388, while the second input is connected to the output of a two input OR gate 399. One input of the OR gate 399 is connected to the non-inverted output of the latch 386, with the BRASEN_signal being provided to the second input. The second input to the NAND gate 396 is inverted and connected to the output of a three input NOR gate 401. The RASB_signal is the output of the NOR gate 401. The non-inverted outputs of the flip-flops 393, 404 and 418 are the inputs to the NOR gate 401.

Figure 17:
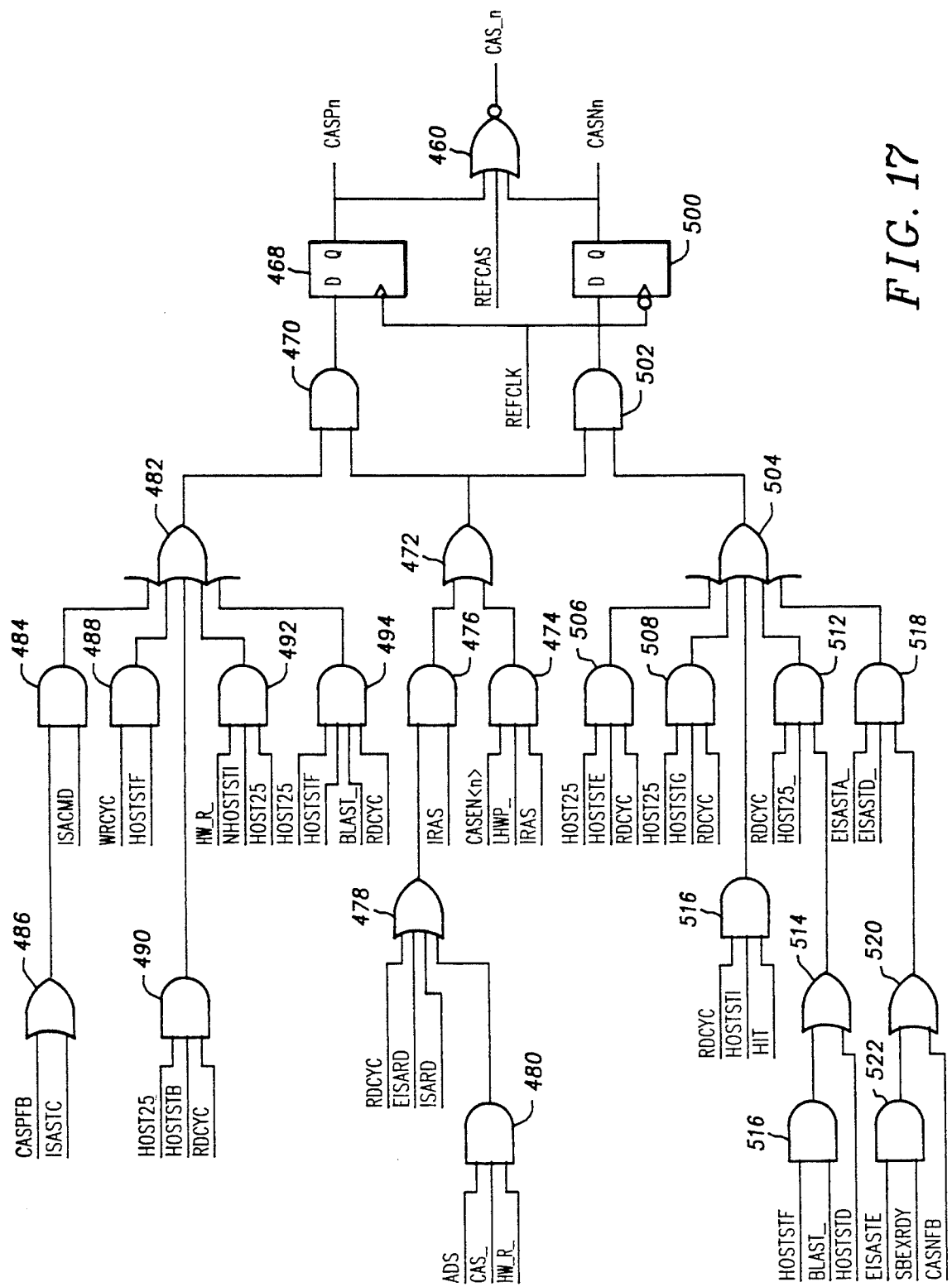

The logic for the CAS control logic 132 is shown in detail in FIG. 17. What is shown in FIG. 17 is one channel or group block of four like sets of logic to develop the four individual CAS signals. This is indicated by the output signal being referred to as CAS_n for the particular byte lanes 0-3 in the preferred embodiment. The CAS_n signal is produced as the output of a three input NOR gate 460. One input to the NOR gate 460 is the REFCAS or refresh CAS signal which is provided as the output of a three input AND gate 462 (FIG. 9). Two of the inputs to the AND gate 462 are the RFRSH and HHLDA signals which indicate a refresh cycle is in operation. The third input is provided by the output of a two input OR gate 464. The START signal is provided as one input to the OR gate 464 to provide timing from the EISA bus, while the non-inverting output of a D-type flip-flop 466 is provided to the second input of the OR gate 464. The START signal is provided to the D input of the flip-flop 466, while the SBCLK signal is provided to the inverted clock input and the HRESET_signal is provided to the inverted reset input of the flip-flop 466. Thus the REFCAS signal is lowered during the start portion of the bus cycle and raised shortly thereafter.

A second input to the NOR gate 460 is the CASPn signal or CAS signal based on the positive edges of the REFCLK signal. This signal is provided at the non-inverting output of a D-type flip-flop 468, whose clocking input receives the REFCLK signal. The D input receives the output of a two input AND gate 470. One input to the AND gate 470 is connected to the output of a two input OR gate 472. One input to the OR gate 472 is connected to the output of a three input AND gate 474. The three inputs to the AND gate 474 are the IRAS signal, LHWP_signal and the CASEN<n>signal. The CASEN<n>signal is the latched version of the CAS enable as developed by the byte enable latches 124, and is used to decode which particular byte lane is being requested by the master device.

The second input to the OR gate 472 is provided by the output of a two input AND gate 476. One input to the AND gate 476 is the IRAS signal, while the second input is provided by the output of a four input OR gate 478. Three of the inputs to the OR gate 478 are the RDCYC, EISARD and ISARD signals, to indicate read cycles on the host, EISA or ISA buses. The fourth input to the OR gate 478 is provided by the output of a three input AND gate 480. The three inputs to the AND gate 480 are the ADS, CAS_and HW_R_signals, which allow an earlier development of the CAS signals without the propagation delay required to develop the RDCYC signal.

The second input to the AND gate 470 is provided by the output of a five input OR gate 482. One input to the OR gate 482 is provided by the output of a two input AND gate 484, one of whose inputs is the ISACMD signal to indicate an active ISA operation. The second input is provided by the output of a two input OR gate 486 whose inputs are the ISASTC and CASPFB signals. The ISASTC signal indicates that the ISA state machine is in state IC, while the CASPFB signal is a logical OR of the four CASPn signals. A second input to the OR gate 482 is provided by the output of a two input AND gate 488. The WRCYC and HOSTSTF or host state machine state HF signals are the inputs to the AND gate 488. A third input to the OR gate 482 is provided by the output of a three input AND gate 490, whose input signals are the HOST25, RDCYC and HOSTSTB or host state machine state HB signals. A fourth input to the OR gate 482 is provided by the output of a three input AND gate 492. The HOST25, NHOSTSTI or host state machine next state HI and HW_R_signals are the inputs to the AND gate 492. The final input to the OR gate 482 is provided by the output of a four input AND gate 494. The HOST25, RDCYC, BLAST_and HOSTSTF signals are provided as the four inputs to the AND gate 494.

The third input to the NOR gate 460 is the CASNn signal or the negative or falling edge of the REFCLK signal based portion of the CAS signal. The CASNn signal is provided by the non-inverting output of a D-type flip-flop 500 whose inverted clock input is connected to the REFCLK signal. The D input of the flip-flop 500 is connected to the output of a two input AND gate 502. One input of the AND gate 502 is connected to the output of the OR gate 472, while the second input is connected to the output of a five input OR gate 504.

One input to the OR gate 504 is provided by the output of a three input AND gate 506, whose inputs are the HOST25, RDCYC and HOSTSTE or host state machine state HE signals. The second input to the OR gate 504 is provided by the output of a three input AND gate 508 whose inputs are the HOST25, RDCYC and HOSTSTG or state HG signals. The third input to the OR gate 504 is provided by the output of a three input AND gate 510 whose inputs are the RDCYC, HIT and HOSTSTI signals. The fourth input to the OR gate 504 is provided by the output of a three input AND gate 512. The RDCYC and HOST25_signals are provided to this AND gate as is the output of a two input OR gate 514. One input to the OR gate 514 is the HOSTSTD or host state machine state HD signal, while the other input is the output of a two input AND gate 516. The HOSTSTF and BLAST_signals are provided to the AND gate 516. The final input to the OR gate 504 is provided by the output of a three input AND gate 518. Signals referred to as EISASTA_and EISASTD_are provided to the AND gate 518 to indicate that the EISA state machine is not in state A or state D, respectively. The third input is provided by the output of a two input OR gate 520. One input to the OR gate 520 is the CASNFB signal, which is the logic O-Ring of the 4 CASn signals. The second input to the OR gate 520 is the output of a two input AND gate 522 whose inputs are the EISASTE and SBEXRDY signals.

Attached as Appendix A is a series of timing diagrams showing the various cycles and the operations of the various outputs during portions of those particular cycles in conjunction with the states of the various state machines. Review of the timing diagrams in combination with the figures and this detailed description is believed to provide a more complete understanding of the operation of a circuit according to the present invention. Appendix A is hereby incorporated as though fully set forth herein.

The foregoing disclosure and description of the invention are illustrative and explanatory thereof, and various changes in the size, shape, materials, components, circuit elements, wiring connections and contacts, as well as in the details of the illustrated circuitry, construction and operation may be made without departing from the spirit of the invention.

I claim:

1. A computer system comprising:
    a central processor unit operating at one of a plurality of designated frequencies and having address, data and control buses;
    a reference clock having a frequency related to said central processor unit operating frequency;
    dynamic random access memory having address and data buses and control inputs;
    buffer and latch units having data buses coupled to said central processor unit data bus and said memory data bus and having latch and output control inputs;
    means for indicating central processor unit operating frequency; and
    a memory controller having address and control inputs coupled to said central processor unit address and control buses, having control output coupled to said memory control inputs and said buffer and latch unit latch and output control inputs, having an input coupled to said reference clock, and having an input coupled to said operating frequency indicating means, said memory controller utilizing a plurality of different reference clock frequencies and central processor unit operating frequencies so that said memory controller control outputs are provided at approximately the same time and duration for each of said central processor unit operating frequencies,
    wherein said memory controller operates synchronously using a state machine, wherein various states are bypassed based on said central processor unit operating frequency and wherein said memory controller state machine is advanced by said reference clock.

2. The computer system of claim 1, wherein for at least one central processor unit operating frequency said reference clock is a multiple of said operating frequency, and for at least one central processor unit operating frequency said reference clock is the same frequency as said operating frequency.

3. The computer system of claim 1, further comprising:
    an external, standardized bus having address, data and control portions; and
    means for coupling said external bus to said central processor unit and said dynamic random access memory; and
    wherein said memory controller is coupled to said external bus control portion to provide control to said dynamic random access memory and said buffer and latch unit when control signals are being over said external bus.

4. The computer system of claim 3, wherein said memory controller operates synchronously using a state machine and wherein various states are bypassed based on central processor unit operating frequency.

5. The computer system of claim 4, wherein said memory controller includes separate state machines for operation with said central processor unit and with said external bus.

6. The computer system of claim 5, wherein for at least one central processor unit operating frequency said reference clock is a multiple of said operating frequency, and for at least one control processor unit operating frequency said reference clock is the same frequency as said operating frequency.

7. The computer system of claim 3, wherein said memory controller state machine is advanced by said reference clock.

8. The computer system of claim 1, wherein said central processor unit operating frequencies include 16, 25 and 33 MHz.

9. The computer system of claim 8, wherein said reference clock frequencies include 32, 25 and 33 MHz.

* * * * *

UNITED STATES PATENT AND TRADEMARK OFFICE
CERTIFICATE OF CORRECTION

PATENT NO.  :   5,333,293
DATED       :   July 26, 1994
INVENTOR(S) :   Randy M. Bonella It is certified that error appears in the above-identified patent and that said Letters Patent is hereby corrected as shown below:

In column 18, line 9, please replace "output" with --outputs--.

Signed and Sealed this

Twenty-eight Day of February, 1995

Attest:

BRUCE LEHMAN

Attesting Officer

Commissioner of Patents and Trademarks